No. 877,093. PATENTED JAN. 21, 1908.
P. KUGEL.
STUFFING BOX.
APPLICATION FILED SEPT. 11, 1905.

2 SHEETS—SHEET 1.

Witnesses:
William Essenwein
William Huffant

Inventor:
Paul Kugel

No. 877,093. PATENTED JAN. 21, 1908.
P. KUGEL.
STUFFING BOX.
APPLICATION FILED SEPT. 11, 1905.
2 SHEETS—SHEET 2.
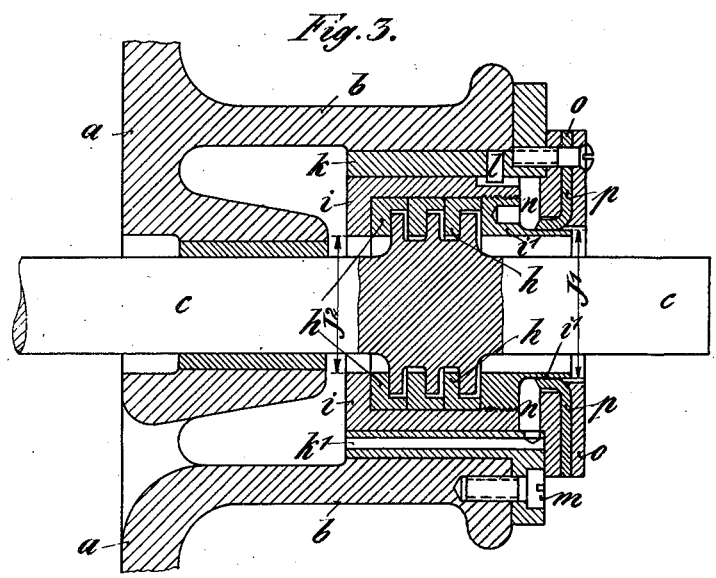
Witnesses:
Inventor:
Paul Kugel.

UNITED STATES PATENT OFFICE.

PAUL KUGEL, OF DUSSELDORF, GERMANY.

STUFFING-BOX.

No. 877,093.  Specification of Letters Patent.  Patented Jan. 21, 1908.

Application filed September 11, 1905. Serial No. 277,907.

*To all whom it may concern:*

Be it known that I, PAUL KUGEL, a citizen of the German Empire, and resident of Graf-Adolfstrasse 89, Dusseldorf, Germany, have invented certain new and useful Improvements in Stuffing-Boxes, of which the following is a specification.

My invention relates to a stuffing box for a rotating shaft containing a metal packing which comprises a series of rings arranged as herein described and my object is to provide a metal packing sealing up, almost without obstructing or checking the rotation of the shaft, a compartment or two adjoining compartments under pressure of any liquid, steam or gas.

Figure 1:
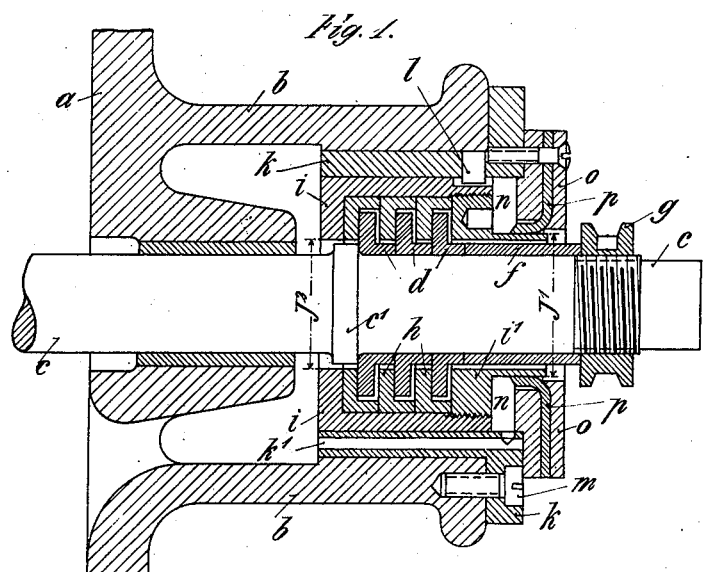
Figure 2:
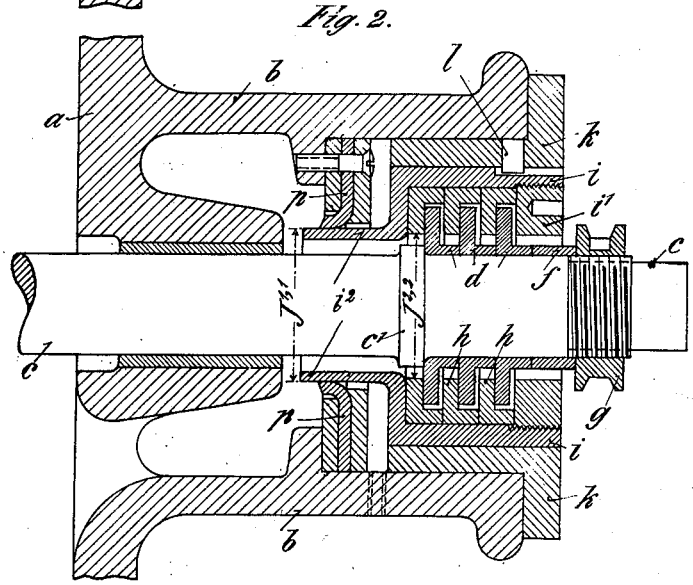

I attain my object by the construction illustrated on the drawing herewith in which Figure 1 is an axial section of a stuffing box where the rings of rectangular section herein below referred to as embracing the shaft are held in position by a sleeve as herein below described and where the leather collar also referred to below is together with a plate sealing up an end compartment connected with the rear compartment by a canal; Fig. 2 is a modification of the construction shown in Fig. 1, the said leather collar being in the rear portion of the journal box, and Fig. 3 is another modification, where the said rings are integral with the shaft..

To the end-wall (*a*) of a rotatory engine is secured a journal box (*b*) through which the shaft (*c*) extends, the examples illustrated showing the end of a shaft as coming out from a rotatory steam engine or the like, though my device may as well be employed for sealing up two adjoining compartments through both of which the rotating shaft is passed and of which each is under another pressure. The said shaft (*c*) is provided with a rib (*c'*) against which abut behind each other a series of loose outward flanged rings (*d*) of rectangular section, held in position by a sleeve or ring (*f*) which is controlled by a screw nut (*g*) by which the said ring (*f*) is pressed on fast against the said rings (*d*) which are thus rigidly secured to and made to revolve with the rotating shaft. Or the said rings (*d*) may be alternately arranged rings of two different diameters or they may as well be integral with the shaft being ribs cut of the latter on a lathe, which are smaller than the rib (*c'*), or otherwise provided. Their number may be determined by the requirements of each particular case. These rings (*d*) are inclosed by another set of concentric rings (*h*) of corresponding section, their inward projecting flanges engaging in the grooves between the ribs or rings (*d*). The said rings (*h*) may be again surrounded and kept close by a bushing (*i*) being united with the latter by means of a screw ring (*i'*) pressing when screwed in against the said rings (*h*). The said bushing (*i*) glides longitudinally within a lining (*k*) secured to the box (*b*) by screws (*m*) and is protected against an overturning by a radial pin (*l*).

Now, the pressure in the engine (*a*) would with its full force act against the rings (*d*), thus producing a surface pressure between the rings which would result in great friction, waste of power and the like. This trouble can be avoided by permitting the pressure in the engine to act not only upon the flat end of the bushing facing the engine, but also upon the other end, thus compensating the two pressures, if not entirely at least sufficiently for the purpose. I, therefore, provide, as shown in Fig. 1, a plate (*o*) sealing up the compartment (*n*) and provided with a collar of leather or other packing and connect the said compartment, adjoining the outer end of the bushing (*i*), by means of a canal (*k'*) with the compartment faced by the other end of the bushing (*i*), thus permitting the pressure in the engine to act as required upon both ends of the same. The force exerted by this way upon the rings (*d*) being determined by the difference of the areas of the circular faces J', J² of Fig. 1, I do not restrict myself to any particular size of the ring surfaces, but leave it to the builder of the device to elect whichever size he may adopt for the particular machine and thus determine the pressure to be exerted by the said rings (*d*) upon the rings (*h*).

As shown by Fig. 2 the aforesaid collar (*p*) of leather or other packing, may be placed behind the bushing (*i*) to embrace a cylindric extension (*i²*) of the latter when depending on the difference in area between the circular surfaces J'' and J²².

I am aware that prior to my invention stuffing boxes and shaft packings with outwardly extending projections and a sleeve with inwardly extending projections in the spaces between the former have been made, I therefore do not claim such a construction broadly, but What I do claim as my invention and desire to protect by Letters Patent is:

1. In a stuffing box for a rotary shaft, the combination with said shaft, of a fixed collar thereon, a plurality of outwardly flanged inner rings closely encircling said shaft, arranged one behind the other behind said collar, means for pressing said inner rings axially one against the other and against said collar, a plurality of inwardly flanged outer rings coaxial with and embracing said inner rings with their inward flanges engaging between the outward flanges of the inner rings, an axially slidable but not rotatable bushing inclosing said outer rings, and a plate with a cupped packing of pliable material fixed to the stuffing box at one end of said bushing and coöperating therewith to relieve the same of a considerable part of the axial fluid pressure thereon.

2. In a stuffing box for a rotary shaft, the combination with said shaft, of a fixed collar thereon, a plurality of outwardly flanged inner rings encircling said shaft arranged one behind the other behind said collar, means for pressing said inner rings one against the other and against said collar, a plurality of inwardly flanged outer rings coaxial with and embracing said inner rings with their inward flanges engaging between the outward flanges of the inner rings, an axially slidable but not rotatable bushing inclosing said outer rings, with a screw-threaded rear aperture for the introduction of said outer rings, a screw-threaded ring screwed into said aperture to close same, a lining fitting the internal periphery of the stuffing box closely encircling said bushing, and formed with a duct to admit fluid pressure from the front to the back of said bushing, and a plate with a cupped packing of pliable material fixed to the rear end of the stuffing box.

3. In a stuffing box for a rotary shaft, the combination with said shaft, of a plurality of outwardly flanged inner rings integral with said shaft and arranged one behind the other, a plurality of inwardly flanged outer rings coaxial with and embracing said fixed rings with their inward flanges engaging between the outward flanges of the fixed rings, an axially slidable but not rotatable bushing inclosing said outer rings, with a screw-threaded rear aperture for the introduction of said outer rings, a screw-threaded ring screwed into said aperture to close same, a lining fitting the internal periphery of the stuffing box closely encircling said bushing, and formed with a duct to admit fluid pressure from the front to the back of said bushing, and a plate with a cupped packing of pliable material fixed to the rear end of the stuffing box.

Signed at Dusseldorf, Germany, this 28th day of August, 1905.

PAUL KUGEL.

Witnesses:
WILLIAM ESSENWEIN,
WILLIAM HUPFAUF.